UNITED STATES PATENT OFFICE.

JUDSON A. DE CEW, OF MOUNT VERNON, NEW YORK, ASSIGNOR TO PROCESS ENGINEERS, INCORPORATED, OF NEW YORK, N. Y., A CORPORATION OF NEW YORK.

ROSIN PRODUCT.

1,394,610.  Specification of Letters Patent.  Patented Oct. 25, 1921.

No Drawing.  Application filed October 6, 1920.  Serial No. 415,149.

*To all whom it may concern:*

Be it known that I, JUDSON A. DE CEW, a citizen of the Dominion of Canada, residing at Mount Vernon, in the county of Westchester and State of New York, have invented certain new and useful Improvements in Rosin Products, of which the following is a specification.

This invention relates to a method of improving the properties of rosin or resinous material in order to make it more suitable for sizing paper. At the present time, there are two kinds of rosin being produced, one being the product which comes direct from living trees which is called in the trade, gum rosin. The other is a product taken from dead trees by means of solvents and which is called in the trade, wood rosin.

Both of these products are colophony resins but the wood rosin is a product which has become polymerized and changed with age so that its physical properties have become altered. This is shown by increased brittleness made evident by its easy disintegration when the precipitate is dehydrated when drying the paper when this rosin is used.

Even the best rosin is sometimes crushed and loses its sizing value under certain drying and machine conditions because it is not sufficiently pliable to stand the strains to which the paper is subjected. This property of rosin precipitates is effected by the rate of its dehydration.

I have discovered how to reduce the rate of dehydration and to modify the brittle properties of these rosins by the addition of specific properties of more plastic materials which are also water repellent and which resist dehydration.

The material which I prefer to use is ordinary paraffin wax although other products like vegetable oil pitch or hard fats may also be used in various proportions. The amount of such material necessary will depend upon the brittle character of the rosin, there being more required treating the wood rosin than the fresh gum rosin.

As an example, I would preferably incorporate by melting and mixing about 15% of wax into wood rosin in order to make it more suitable for sizing paper whereas from 5% to 10% would be sufficient to incorporate into gum rosin in order to give it the best properties for sizing.

By improving the properties of resins in this manner, they act entirely like new materials and not as a mixture of ingredients of different properties.

If wax or fatty emulsions are used separately in sizing paper, great difficulties are experienced in operation and the properties of the paper are materially altered in a way which makes the product unsatisfactory. It is necessary, therefore, that the wax be dissolved directly in the rosin in such a manner that they modify the property of the rosin but to a slight extent.

What I claim is:

1. A method of imparting more water repellent characteristics to rosin and its precipitates which consists in mixing a melted wax with a melted rosin.

2. A resinous product for making rosin size which consists of ordinary colophony rosin in which is dissolved up to 15% waxy material.

3. A product for making rosin size which consists principally of abietic acid with its properties slightly modified by a small quantity of wax dissolved therein.

4. A rosin size containing rosin and wax, in which the wax is approximately 7% of the total rosin.

5. A rosin size containing abietic acid and a small quantity of wax dissolved therein, the acid having its properties slightly modified by the quantity of wax dissolved therein.

In testimony whereof I have affixed my signature to this specification.

JUDSON A. DE CEW.